Nov. 22, 1960     E. F. BOYER     2,961,023
VEGETABLE TRIMMING MACHINE
Filed Jan. 13, 1958
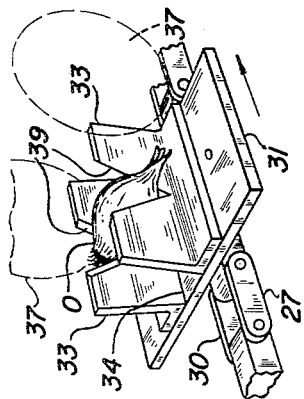
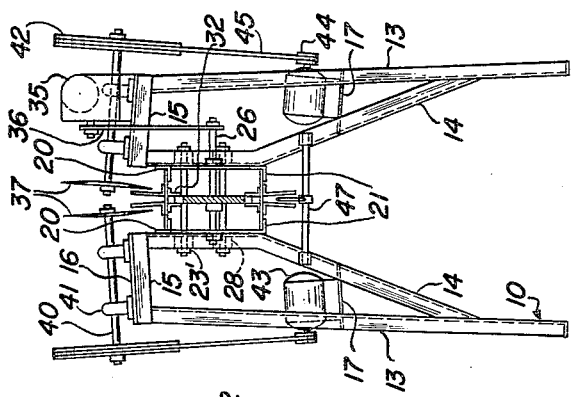
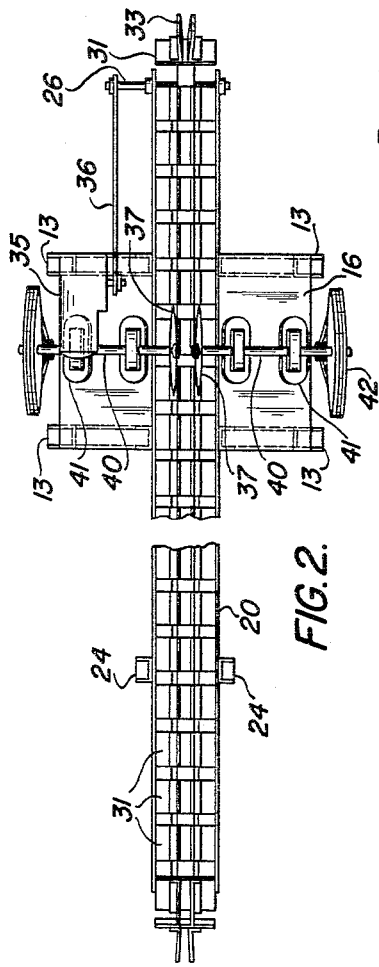
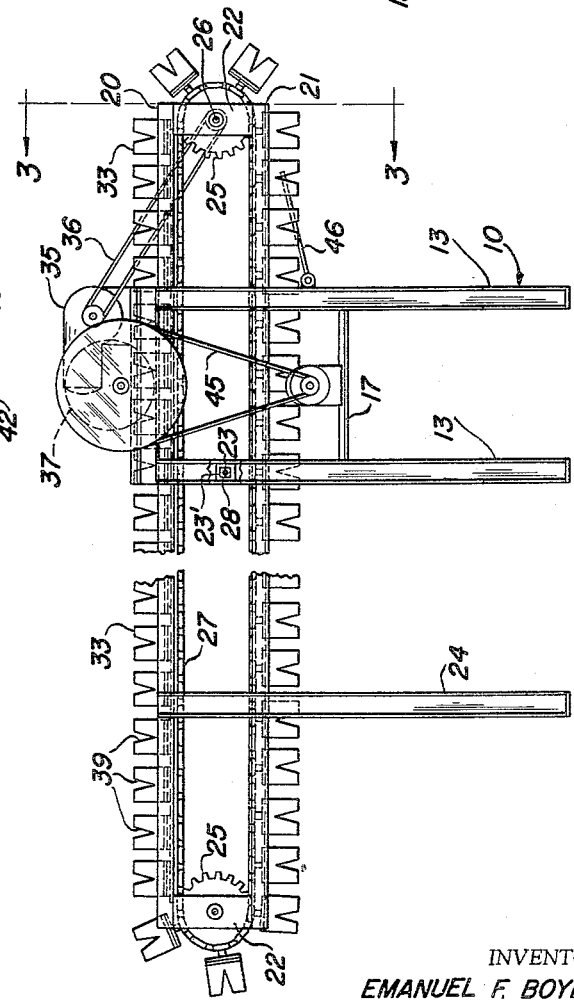
INVENTOR.
EMANUEL F. BOYER
BY
Attorney United States Patent Office 2,961,023
Patented Nov. 22, 1960

2,961,023

VEGETABLE TRIMMING MACHINE

Emanuel F. Boyer, Barrie Center, N.Y.
(R.D. #2, Albion, N.Y.)

Filed Jan. 13, 1958, Ser. No. 708,578

4 Claims. (Cl. 146—83)

The present invention relates to a machine for trimming end portions from the body or bulbous part of a plant, vegetable, or fruit. In particular, the invention relates to a machine for trimming the protruding root end and stem from the body of onions.

In processing onions in particular, removal of the root portion of the onion is necessary because a considerable amount of dirt is usually held in and between the root hairs and fibers. Removal of the root end and stem of an onion also facilitates peeling the outer layers from the onion. Also, a small core is usually formed as a part of the root of an onion, and this core is very hard and has an undesirable flavor, and must be removed if onions of good flavor are desired.

The root ends and stems of onions have been removed manually by pushing the onion against a revolving knife, first removing one end, then turning the onion around, and removing the other end. This is a slow procedure, and is quite dangerous. Moreover, the amount of the onion that is removed depends on the skill of the operator, and frequently too much or too little is removed in this way.

Machines have been developed for trimming onions, beets, and the like, but such machines have tended to be very complicated in design.

The principal problem encountered in designing a machine for trimming onions or beets is that onions as well as beets differ from one another greatly in size and shape. In the past, machines that have been designed to accommodate beets or onions of different sizes have been quite complex. One such machine, for example, has included a gauging device to sense the size of the vegetable and to hold the cutting device in the proper position for a vegetable of that size. Machines of this type are very complex because of the necessity for transmitting power in any adjusted position between relatively adjustable shafts, because of the difficulties inherent in constructing accurate gauging means to control the position of the knives, and because of the complicated mechanisms that were employed to discharge the vegetable after trimming.

One object of the present invention is to provide a novel trimming apparatus for removing the root ends and stems of bulbous vegetables such as onions, beets, and the like, and that is characterized by simplicity in design and construction, for inexpensive manufacture and easy maintenance.

Another object of the invention is to provide a trimming apparatus for bulbous vegetables that has relatively few moving parts, but that will nevertheless trim accurately a predetermined portion of the root end and stem from bulbous vegetables, regardless of differences in the sizes of the bulbous bodies of the individual vegetables.

A further object of the invention is to provide an automatic machine capable of trimming the root ends and stems from bulbous vegetables and the like, more uniformly and more rapidly than has been possible in the past.

Yet another object of the invention is to provide an automatic machine for trimming the root ends and stems from bulbous vegetables and that can accommodate vegetables of different sizes without the necessity of any adjustment to the machine.

A related object of the invention is to provide a machine of the character just described that will accommodate bulbous vegetables of different body sizes in carriers or holders that have no moving parts and hence are inexpensive to manufacture and simple to maintain.

Other objects of the invention will become obvious to those skilled in the art from consideration of the specific embodiment of the invention that is described hereinafter and that is illustrated in the drawing.

The machine constituting this embodiment of the invention comprises an endless conveyor chain, on which are secured a plurality of receptacles. Each receptacle comprises a base and a pair of plates that are secured to the base to project upwardly from the surface of the base. The plates are mounted to converge in a direction downwardly toward the base, to form a pocket of inwardly decreasing width. The two plates of each receptacle act as walls, and are formed with opposed V-notches whose apices are disposed adjacent the base of the receptacle.

At a trimming station on the machine, a pair of rotary knives are mounted in cutting position along the outside surfaces of the walls of the receptacles.

As the upper reach of the conveyor chain travels toward the trimming station, one onion can be loaded in each receptacle, with its root end and stem engaged in the opposed notches in the walls of the receptacle. Because the walls converge toward the base, each onion will drop downward, to be wedged between the walls and supported thereby, with its root end and stem projecting on opposite sides of the receptacle through the notches. As the conveyor is moved to carry the receptacles past the trimming station, the rotating knives trim off the projecting portions of each onion. As the conveyor moves over a sprocket at one end, many of the onions fall out of the receptacles. Any onions that are wedged tightly in place are ejected by the rod that is mounted beneath the lower flight of the conveyor to pass between the opposed walls of each receptacle as the receptacle travels past the rod.

In the drawing:

Fig. 1 is a side elevation, partly broken away, of an onion trimming machine constructed according to one embodiment of the invention;

Fig. 2 is a top plan view thereof;

Fig. 3 is an end view thereof taken on the line 3—3 of Fig. 1; and

Fig. 4 is a perspective view, on an enlarged scale, of a single receptacle having an onion supported therein, and showing in phantom the positions of the rotary knives.

Referring now in detail to the drawings, the machine comprises a pair of frame-like sections 10, that are mirror images of each other. Each of these sections 10 respectively includes a pair of vertical standards 13 that are spaced from one another lengthwise of the frame section and a pair of diagonally and vertically extending members or braces 14. Each standard 13 and its associated brace member 14 are connected by beam 15 that is mounted across their tops. A plate 16 is secured across the tops of the two beams 15 of each frame section, to provide a flat supporting surface or table. A shelf 17 is mounted between the standards 13 and the braces 14 of each frame section, in generally parallel relation to the table 16.

An elongate angle iron 20 is mounted on the insides of the braces 14 of each frame section adjacent the top of their standards to project horizontally beyond each end of each of the frame sections 10 respectively. A second angle iron 21 is secured on the insides of the braces 14 of each frame section below and parallel to the first angle iron 20, to project beyond the ends of the frame section the same distance as angle irons 20. At their ends, the angle irons 20, 21 of each frame section are secured together in vertically spaced relation by vertically-extending plates 22. The angle irons 20, 21 respectively of the two frame sections confront one another to form two horizontally extending, parallel tracks. Vertically disposed legs 24 are secured to the angle irons 20 and 21 along the length of the angle irons to support the same. As many legs 24 may be secured to the projecting parts of the angle irons 20, 21 as are necessary to provide rigid support therefor.

The two frame sections 10 are adjustably secured together in horizontally spaced relation by a plurality of elongate bolts 23 and nuts 23'. The braces 14 are preferably U-shaped in cross-section; and a pair of blocks 28 are welded between the flanges of each of the braces. These blocks are bored to receive the shanks of the bolts 23, to permit ease of access to the nuts 23' for adjustment of the lateral spacing between the frame sections 10.

Sprockets 25 are secured on shafts 26 that are journaled between the confronting steel plates 22 at each end of the machine respectively. An endless chain 27 is passed around the two sprockets 25. The chain 27 comprises a plurality of links 30 that are connected together in the usual manner. At substantially uniform intervals along the chain, a link 32 may be inserted. Base plates 31 are rigidly connected to these links 32 in any convenient manner, to extend along the path of the conveyor chain 27.

The base plates 31 are mounted on the chain to ride along the horizontally-extending surfaces of the opposed angle irons 20, as best shown in Fig. 3, both along the upper and along the lower flight of the chain.

A pair of outwardly divergent wings or walls 33 are secured on each base plate 31. In the preferred embodiment of the invention illustrated, the walls 33 are formed from bent, heavy gauge sheet metal stock, and are welded to the base plate 31 as denoted at 34. The two walls 33 are spaced apart on the base plate 31, by a distance that is smaller than the size of the smallest bulb of a bulbous vegetable that is to be trimmed in the machine. The walls 33 are formed with V-notches 39, whose apices are adjacent the base plate 31.

A motor 35 is mounted on the flat plate 16 of one frame section 10 to drive one of the sprockets 25. The motor 35 is connected to the drive sprocket through a belt 36 that is mounted around a pair of pulleys, one of which is secured to the shaft 26, and the other of which is secured to the armature shaft of the motor 35.

A pair of rotary knives 37 are mounted with their cutting edges disposed in planes parallel to the outer faces of the walls 33, and in very close but adjustable relationship thereto. Each of the rotary knives 37 is mounted on a shaft 40 that is supported from bearing blocks 41 that are secured on each flat plate 16. A pulley 42 is mounted at the outer end of each shaft 40. A motor 43 is mounted on each shelf 17, and a pulley 44 is mounted on the armature shaft of each motor. A drive belt 45 is passed around the pulleys 42 and 44 to rotate each shaft 40 and knife 37 upon rotation of the electric motors 43. The shafts 37 have their axes inclined to the horizontal to tip the knives 37 to obtain efficient cutting action.

A rod 46 is mounted on a bar 47 that is supported between opposed diagonal portions of the parts 14 of the two frame sections. The rod 46 is rigidly fixed to the shaft 47 to project upwardly therefrom and to be disposed so that it will enter between the opposed walls 33 of successive receptacles as they are carried along the lower flight of the chain.

The corresponding walls 33 on all of the bases 31 are mounted in alignment along the path of the chain 27. This permits the rotary knifes 37 to be as close as practicable to the outer surfaces of the walls 33.

The divergent walls 33, together with the bases 31, form receptacles in which onions can be placed. As shown in Fig. 4, the sides of the V-notches 39 are inclined better to be adapted to the shape of an onion to support the onion on smooth surfaces that will not cut into or otherwise damage the onion. When an onion O is placed between the walls 33 of a receptacle, with the root portion of the onion engaged in the notch 39 of one wall 33 and with its stem engaged in the notch 39 of the other wall 33, the onion will slip down between the opposed walls 33 until it is wedged lightly in position. The projecting portions of the root and stem of the onion O can then be trimmed off by the knives 37 as the receptacle or pocket is carried past the knives. As the receptacles are carried on the chain 27 around the right end of the machine, the onions can fall freely, by gravity, out of the receptacles. Any onions that have become wedged in place are dislodged by the rod 46.

Among the advantages of the machine are that onions of considerably different size can be accommodated, without the need for adjusting the machine in any way, and with uniformly good trimming action. Moreover, the outward slope of the flat plates 16 on each of the frame sections 10, 11, respectively, causes the trimmed parts of the onions or other vegetables to fall away from the conveyor instead of into it and furthermore permits the trimmed portions of the onions to be swept away very easily. The only moving parts in the machine are the conveyor and the rotating knives.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. In a machine for trimming vegetables, an endless conveyor having a plurality of vegetable receptacles rigidly secured thereon for movement past a trimming station, each of said receptacles comprising a base portion and a pair of outwardly diverging walls secured thereon, said walls being spaced apart transversely with respect to said conveyor and being formed with transversely registering V-shaped notches that have their apices adjacent said base, whereby a bulbous vegetable may be placed between said walls with its root and stem engaged in said opposed notches, respectively, and projecting on opposite sides of said receptacle, and trimming means mounted on opposite sides of said conveyor closely adjacent the outsides of said walls and substantially parallel thereto to sever said projecting root end and stem as the vegetable is carried in its receptacle past the trimming station.

2. In a machine for trimming bulbous vegetables which have root ends and stems at opposite ends thereof, an endless conveyor, receptacles secured in spaced relation on the outside of said conveyor, each of said receptacles comprising two opposed outwardly diverging plates disposed to receive the bulbous portion of a vegetable therebetween, said plates being notched to permit the root end and stem of the vegetable to project beyond opposite sides of each receptacle when the vegetable is placed in the receptacle, and a pair of rotary knives mounted at a trimming station along the path of said conveyor, said knives being disposed, respectively, to be closely adjacent and substantially parallel to the opposite outside surfaces, respectively, of said receptacles to sever the projecting root end and stem of a vegetable as the vegetable is carried in its receptacle past said knives.

3. In a machine for trimming vegetables having root ends and stems at opposite ends thereof, a supporting frame, a pair of spaced sprockets rotatably mounted in said frame adjacent opposite ends thereof to rotate on parallel axes, an endless chain mounted to travel around and between said sprockets, parallel tracks mounted on said frame, a plurality of receptacles mounted on the outside of said chain along the length thereof, each of said receptacles comprising a rigid base and a pair of plates secured on said base, said rigid bases being mounted to ride along said tracks to guide said receptacles through a predetermined path as the chain moves in its upper and lower flights, the plates of each pair being mounted to diverge outwardly from the associated base and being formed with opposed generally V-shaped notches that have their apices adjacent the base of the pair to receive a vegetable between opposed plates and to hold said vegetable transversely of the path of said chain with its root end and stem engaged in said opposed notches and projecting beyond opposite sides of said receptacle, and trimming means mounted at a trimming station at opposite sides of said conveyor closely adjacent the outsides of said plates and substantially parallel thereto to sever the projecting root ends and stems of the vegetables as they are carried in their receptacles past the trimming station.

4. In a machine for trimming bulbous vegetables which have root ends and stems at opposite ends thereof, a supporting frame, a pair of spaced sprockets rotatably mounted in said frame adjacent opposite ends thereof to rotate on parallel axes, an endless chain mounted around said sprockets, parallel tracks mounted on said frame, a plurality of receptacles mounted on said chain along the length thereof, each of said receptacles comprising a rigid base and a pair of opposed plates secured on said base, said rigid bases being mounted to ride along said tracks to guide said receptacles through predetermined paths as the chain moves in its upper and lower flights, said plates being mounted to converge inwardly toward said base to receive the bulbous portion of the vegetable therebetween, each pair of plates being formed with transversely aligned V-notches whereby a vegetable may be placed between said plates with its root end and stem projecting beyond opposite sides of the receptacle, and a pair of rotary knives mounted at opposite sides of said conveyor at a trimming station along the path of the chain, said knives being disposed to be closely adjacent the outside surfaces of said receptacles and substantially parallel to said outside surfaces to sever the projecting root ends and stems of the vegetables as they are carried by their receptacles past the trimming station.

References Cited in the file of this patent
UNITED STATES PATENTS

| | | |
|---|---|---|
| 208,970 | Eberhard et al. | Oct. 15, 1878 |
| 2,580,599 | Rogers | Jan. 1, 1952 |
| 2,801,662 | Brunnier | Aug. 6, 1957 |